US010151178B2

United States Patent
Stephenson et al.

(10) Patent No.: US 10,151,178 B2
(45) Date of Patent: Dec. 11, 2018

(54) OPTIMIZATION OF FUEL CONSUMPTION IN EQUIPMENT USED IN WELL SITE OPERATIONS (71) Applicant: Halliburton Energy Services, Inc., Houston, TX (US)

(72) Inventors: Stanley V. Stephenson, Duncan, OK (US); Matthew R. Margis, Lawton, OK (US); Philip A. Rogers, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 291 days.

(21) Appl. No.: 15/022,192

(22) PCT Filed: Oct. 15, 2013

(86) PCT No.: PCT/US2013/065014
§ 371 (c)(1),
(2) Date: Mar. 15, 2016

(87) PCT Pub. No.: WO2015/057197
PCT Pub. Date: Apr. 23, 2015

(65) Prior Publication Data
US 2016/0230512 A1    Aug. 11, 2016

(51) Int. Cl.
*E21B 41/00*    (2006.01)
*E21B 43/26*    (2006.01)
(Continued)

(52) U.S. Cl.
CPC .......... *E21B 41/0092* (2013.01); *E21B 21/00* (2013.01); *E21B 43/26* (2013.01); *E21B 44/00* (2013.01); *G05B 13/021* (2013.01)

(58) Field of Classification Search
CPC ...... E21B 21/00; E21B 41/0092; E21B 43/26; E21B 44/00; G05B 13/021
See application file for complete search history.

(56) References Cited

U.S. PATENT DOCUMENTS 6,020,651 A * 2/2000 Nakamura ............ E02F 9/2235
123/496
6,109,367 A 8/2000 Bischel et al.
(Continued)

FOREIGN PATENT DOCUMENTS

JP    2005-140301 A    6/2005
WO    2011-149478 A1    12/2011

OTHER PUBLICATIONS

International Search Report and Written Opinion issued in related PCT Application No. PCT/US2013/065014 dated Jul. 8, 2014, 13 pages.

*Primary Examiner* — Abdelmoniem I Elamin
(74) *Attorney, Agent, or Firm* — John W. Wustenberg; Baker Botts L.L.P.

(57) ABSTRACT

Systems and methods for monitoring, calculating, and/or optimizing the consumption of fuel in operating motorized equipment in well site operations or other jobs are provided. In one embodiment the methods comprise: calculating a set of fuel consumption rates for one or more engines at a job site as a function of a speed of each engine, a hydraulic horsepower load to be provided by each engine, and an external parasitic load to be provided by each engine; identifying one or more operating speeds for the one or more engines during an operation at the job site based at least in part on the set of fuel consumption rates for the one or more engines; and operating the one or more engines at the one or more operating speeds during an operation at the job site.

17 Claims, 4 Drawing Sheets

(51) Int. Cl.
*G05B 13/02* (2006.01)
*E21B 44/00* (2006.01)
*E21B 21/00* (2006.01)

(56) References Cited

U.S. PATENT DOCUMENTS

| | | | | |
|---|---|---|---|---|
| 7,631,495 | B2 * | 12/2009 | Naruse | E02F 9/2235 60/426 |
| 7,789,795 | B2 * | 9/2010 | McKenzie | F16H 37/0846 477/115 |
| 9,065,300 | B2 * | 6/2015 | Williams | F02D 19/10 |
| 2009/0261599 | A1 | 10/2009 | Alston et al. | |
| 2009/0312885 | A1 | 12/2009 | Buiel | |
| 2014/0277905 | A1 * | 9/2014 | Anderson | G07C 5/08 701/29.3 |

* cited by examiner

OPTIMIZATION OF FUEL CONSUMPTION IN EQUIPMENT USED IN WELL SITE OPERATIONS

CROSS-REFERENCE TO RELATED APPLICATION

The present application is a U.S. National Stage Application of International Application No. PCT/US2013/065014 filed Oct. 15, 2013, which is incorporated herein by reference in its entirety for all purposes.

BACKGROUND

The present disclosure relates to systems and methods for monitoring, calculating, and/or optimizing the consumption of fuel in operating motorized equipment (e.g., pumping equipment) in well site operations or other jobs.

The performance of subterranean operations at a well site entails various steps, each using a number of devices. Many subterranean operations entail pumping one or more treatment fluids into the subterranean formation. For example, drilling operations play an important role when developing oil, gas or water wells or when mining for minerals and the like. During the drilling operations, a drill bit passes through various layers of earth strata as it descends to a desired depth to drill a well bore. During the drilling process, a drilling fluid may be pumped through the drillstring into the well bore, among other reasons, to circulate drill cuttings out of the well bore to the surface and/or to cool the drill bit or other downhole equipment. In another example, hydraulic fracturing operations are often used to increase the production of desired fluids (e.g., hydrocarbons, water, etc.) from a formation of interest. In hydraulic fracturing operations, a fracturing fluid is pumped into a well bore that penetrates a subterranean formation at a sufficient hydraulic pressure to create or enhance one or more cracks, or "fractures," in the subterranean formation. The creation and/or enhancement of these fractures, among other things, may enhance the flow of fluids through the subterranean formation so that they may be produced out of the subterranean formation more readily. In another example, downhole cementing operations typically involve the mixing and pumping of large volumes of cement into a well bore, among other purposes, to prepare the well bore for the production of fluids.

In these and other well site operations, motorized pumps as well as other types of engine-driven motorized equipment (e.g., drilling motors, blenders, conveyers, and the like) may be used to perform a variety of tasks related to constructing, completing, and maintaining the well site and/or producing fluids from the well. For example, heavy duty pumps typically are used to transport treatment fluids such as drilling fluids and fracturing fluids from tanks, trucks, or pits at a well site into the well bore and to introduce them into the well bore at the rates and pressures needed to perform a particular treatment or operation. The operation of this equipment often requires large amounts of fuel (e.g., diesel, gasoline, etc.), which may be costly to procure, transport, and maintain at a well site.

BRIEF DESCRIPTION OF THE FIGURES

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to systems and methods for monitoring, calculating, and/or optimizing the consumption of fuel in operating motorized equipment (e.g., pumping equipment) in well site operations or other jobs.

More specifically, the present disclosure provides systems and methods for monitoring, calculating, and/or optimizing the amount of fuel consumed by one or more engines used to run various types of motorized equipment at a well site or other type of job site. Examples of such motorized equipment may include, but are not limited to, pumping units, blenders, mixers, agitators, conveyors, drilling motors, and the like. The total fuel consumption by an engine on a well site pumping unit is a function of three elements: the hydraulic horsepower that the unit generates, the external parasitic load of the unit, and the internal parasitic load of the unit. The external parasitic load of the unit comprises any power output by the engine that the unit does not use to generate hydraulic horsepower, which may include, for example, power that may be used to operate fans or other auxiliary components of the pumping unit. The internal parasitic load of the unit comprises power lost to internal friction and reciprocal and rotating masses in the engine. Each of these three elements depends upon the speed of the engine, and impacts fuel consumption in a non-linear manner. The methods and systems of the present disclosure may be used to calculate the impact of these elements on fuel consumption for one or more pumping units or other motorized equipment at a well site. These calculations may be run prior to and/or at substantially the same time as one or more operations at the well site.

The methods and systems of the present disclosure may, among other benefits, allow operators to determine the number of pumps and the engine speed(s) at which to run them that will optimize the amount of fuel used in a well site operation. These calculations may be performed in or near real time at a well site, which may permit operators to adjust engine speed and/or other parameters to further refine and optimize the equipment's fuel consumption. The methods and systems of the present disclosure also may permit operators to more accurately predict the amount of fuel needed for a particular operation in advance, which may reduce cost associated with procuring, transporting, and storing fuel at a well site. Generally, these and other benefits of the methods and systems of the present disclosure may permit operators to conduct well site operations in a more efficient and/or cost-effective manner, and/or to minimize the total cost of ownership for the equipment. In certain embodiments, the methods and systems and the present disclosure also may reduce certain types of emissions produced by engines as they burn fuel.

Figure 1:
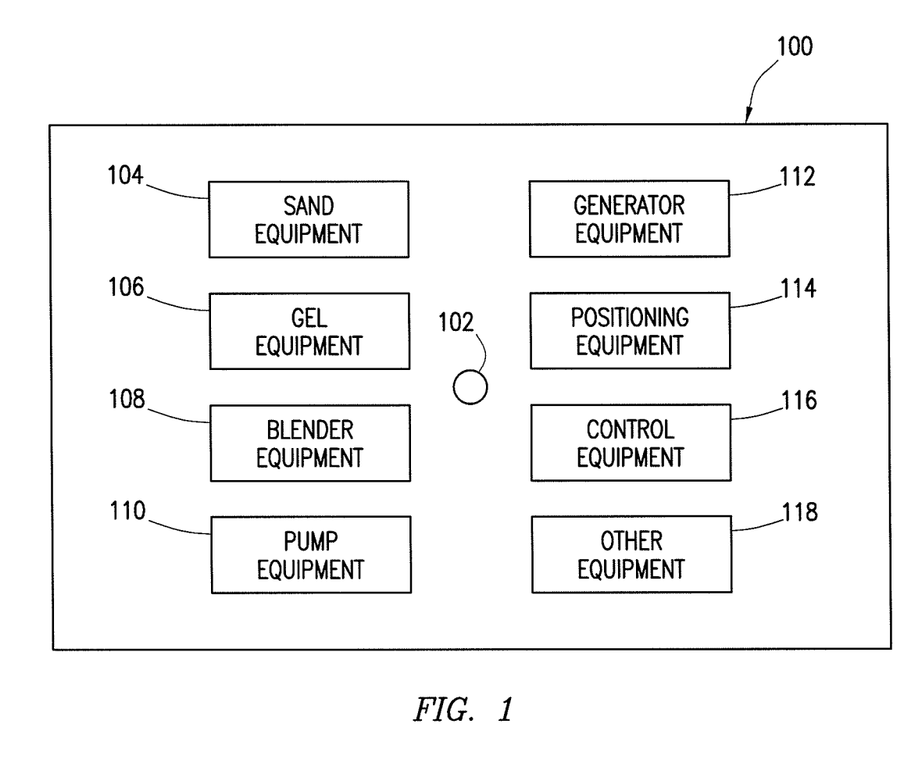
FIG. 1 is a diagram illustrating a job site with a well bore according to certain embodiments of the present disclosure.

FIG. 1 illustrates a job site 100 in accordance with one aspect of the present disclosure. The job site 100 may comprise a well 102 or other suitable structure at which equipment is used to perform an operation. Other types of sites may include, for example, a construction site. The equipment includes one or more internal combustion or other suitable engines that consume fuel to perform work at the site 100. The well 102 may be a hydrocarbon or other well for producing oil, gas and/or other resources. In this embodiment, the operation may comprise, for example, a cementing operation, a fracturing operation, or other suitable operation where equipment is used to drill, complete, produce, enhance production, and/or work over the well 102. Other operations may include, for example, operating or construction of a facility.

Referring to FIG. 1, the job site 100, for the illustrated embodiment, includes sand equipment 104, gel equipment 106, blender equipment 108, pump equipment 110, generator equipment 112, positioning equipment 114, control equipment 116 and other equipment 118. The equipment may be, for example, truck or rig-mounted equipment. The sand equipment 104 may include transport trucks for hauling to and storing at the site 100 sand for use in the job. The gel equipment 106 may include transport trucks for hauling to and storing at the site 100 materials used to make a gel for use in the job. The blender equipment 108 may include blenders, or mixers for blending materials at the site for the job. The pump equipment 110 may include pump trucks for pumping materials down the well 102 for the job. The generator equipment 112 may include generator trucks for generating electric power at the site 100 for the job. The electric power may be used by sensors, control and other equipment. The positioning equipment 114 may include earth movers, cranes, rigs or other equipment to move, locate or position equipment or materials at the site 100 or in the well 102.

The control equipment 116 may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the controller may be a personal computer, a network storage device, a network terminal, or any other suitable device and may vary in size, shape, performance, functionality, and price. The control equipment 116 may include an instrument truck coupled to some, all, or substantially all of the other equipment at the site 100 and/or to remote systems or equipment. The control equipment 116 may include one or more processing resources such as a central processing unit (CPU) or hardware or software control logic. The control equipment 116 may include a special purpose computer programmed to perform the functions described herein. Any suitable processing application software package may be used by the controller to process the data. Examples of special purpose computer systems programmed to perform these functions include, but are not limited to, those used in the SENTRY™ and INSITE™ services and systems provided by Halliburton Energy Services, Inc. The control equipment 116 may be connected by wireline or wirelessly to other equipment to receive data for or during the job. The data may be received in or near real-time or otherwise. In another embodiment, data from or for equipment may be keyed into the control equipment 116.

The control equipment 116 may be coupled to or include a memory that contains the programs to be executed as the control equipment 116 performs its functions as well as constants and variables used to perform those functions. The control equipment 116 may be coupled to or include one or more input/output devices 224, such as a keyboard, a mouse, a monitor or display, a speaker, a microphone, or an external communications interface. The control equipment 116 also may include one or more buses operable to transmit communications between the various hardware components. In certain embodiments, the control equipment 116 produces data that may be presented to the operation personnel in a variety of visual display presentations such as a display communicatively coupled to or included in control equipment 116. The data may be presented to the user in a graphical format (e.g., a chart) or in a textual format (e.g., a table of values). In other example systems, the display may show warnings or other information to the operator when the control equipment 116 detects a particular condition relating to fuel consumption, such as the amount of fuel being used by a particular engine exceeding a preset amount.

The control equipment 116 may be located on one or more pieces of equipment at the site 100, on an instrument truck located at the site 100, or at a remote location. Each piece of equipment at site 100 may include its own control equipment 116, or multiple pieces of equipment at the site 100 may share common control equipment 116. In certain embodiments where certain pieces of equipment at the site 100 include or are coupled to their own control equipment 116 in accordance with the present disclosure, that equipment may be operated so as to minimize fuel consumption on any individual unit, while other pieces of equipment may be run traditionally. In other embodiments, multiple pieces of equipment or all of the equipment at the site 100 may include or be coupled to control equipment 116 in accordance with the present disclosure, and may be operated so as to minimize the total fuel consumption for the multiple pieces of equipment.

The control equipment 116 also may be communicatively coupled to a network, such as a local area network or the Internet, either directly or through one or more input/output devices (e.g., an external communications interface). In certain embodiments, such a network may permit the data from the control equipment 116 to be remotely accessible by any computer system communicatively coupled to the network via, for example, a satellite, a modem or wireless connections. As would be appreciated by those of ordinary skill in the art, with the benefit of this disclosure, a controller and/or computer system communicatively coupled to control equipment 116 also may collect data from multiple well sites and/or wells to perform quality checks across a plurality of wells. The control equipment 116 also may be communicatively coupled to, for example, a remote real time operating center whereby the remote real time operating center is able to send and/or receive data from the control equipment 116. In certain embodiments, the data may be pushed at or near real-time enabling real-time communication, monitoring, and reporting capability. This may, among other benefits, allow an operator to continuously monitor fuel consumption at a job site, and allow the collected data to be used in a streamline workflow in a real-time manner by other systems and operators concurrently with acquisition.

The terms "couple" or "couples," as used herein are intended to mean either an indirect or a direct connection. Thus, if a first device couples to a second device, that connection may be through a direct connection, or through an indirect connection via other devices and connections. The term "communicatively coupled" as used herein is intended to mean coupling of components in a way to permit communication of information therebetween. Two components may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein.

The other equipment 118 may comprise equipment also used by or at the job or ancillary to the job. For example, the other equipment 118 may comprise personal or other vehicles used to transport workers to the site 100 but not directly used at the site 100 for the job.

During a particular operation at the job site, various portions of the equipment shown may be operated to perform work to accomplish the objectives of the operation. For example, in a fracturing operation, one or more fracturing fluids may be prepared using, for example, gel equipment 106 and/or blender equipment 108 as well as other equipment, and be pumped into the well 102 using the pump equipment 110. The fracturing fluid may be pumped into the well 102 at a sufficient hydraulic pressure to create or enhance one or more cracks or fractures in the subterranean formation penetrated by the well.

During equipment operation, work is performed by engines which consume fuel and produce emissions into the atmosphere. The engines may be operated at idle, at full horsepower, or at other suitable loads. Examples of engines that may be suitable in the methods, operations, and systems of the present disclosure may include engines commercially available from suppliers such as Caterpillar (Peoria, Ill.), Cummins, Inc. (Columbus, Ind.), MTU (Freidrechshafen, Germany), and others. Utilization data may be estimated, monitored, or otherwise collected from the equipment and/or stored and used in or near real-time or otherwise to determine the amount of fuel being consumed by the equipment, and the utilization data may be sensed by sensors coupled to the equipment or engines of the equipment and uploaded to an instrument truck or other suitable data gathering and storage device at the job site (e.g., control equipment 116 in FIG. 1), or may be transmitted to a suitable data gathering and storage device at an offsite location.

Figure 2:
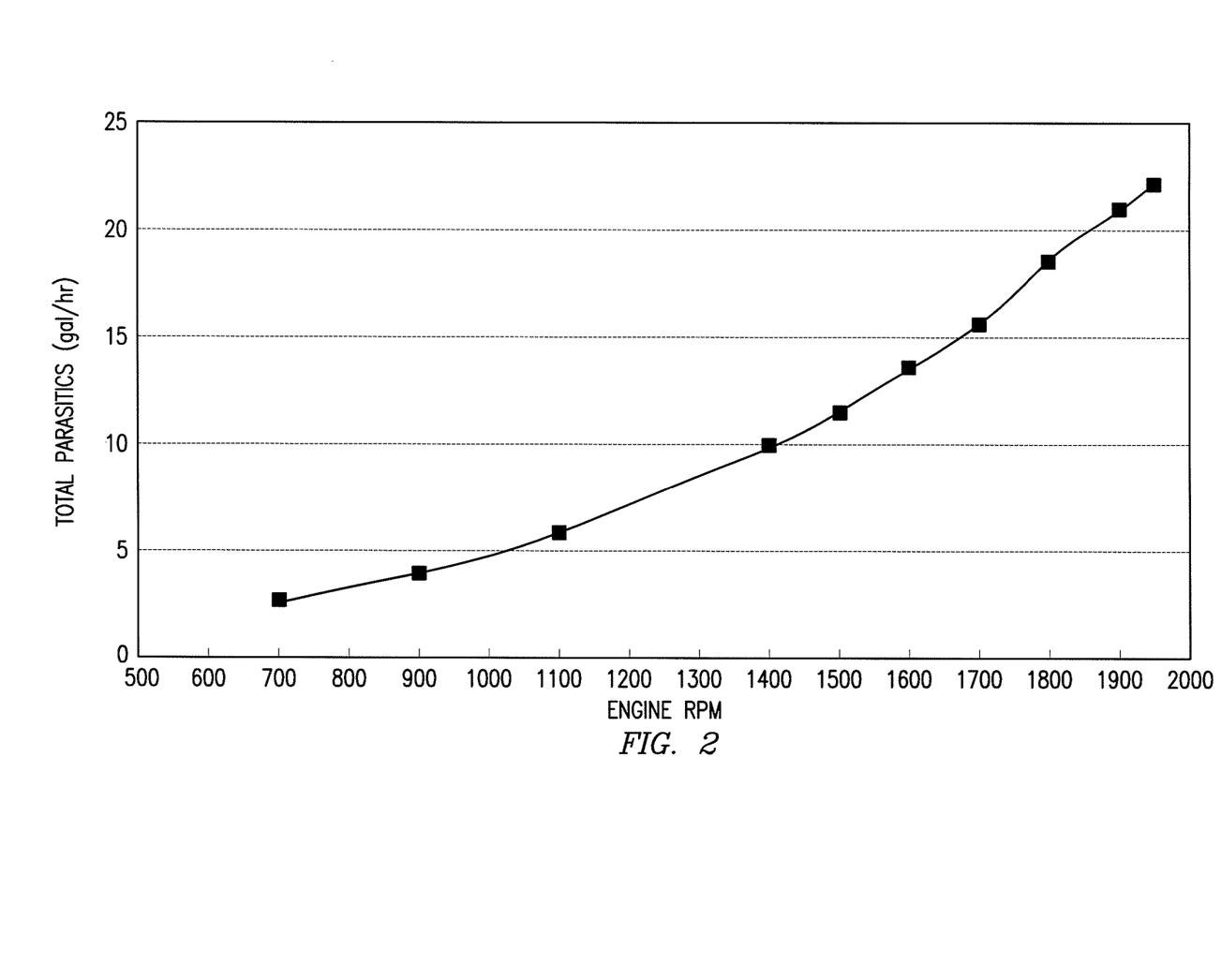
FIG. 2 is a graph illustrating data relating to the total parasitic fuel consumption rate of an engine as a function of engine speed according to one embodiment of the present disclosure.
Figure 3:
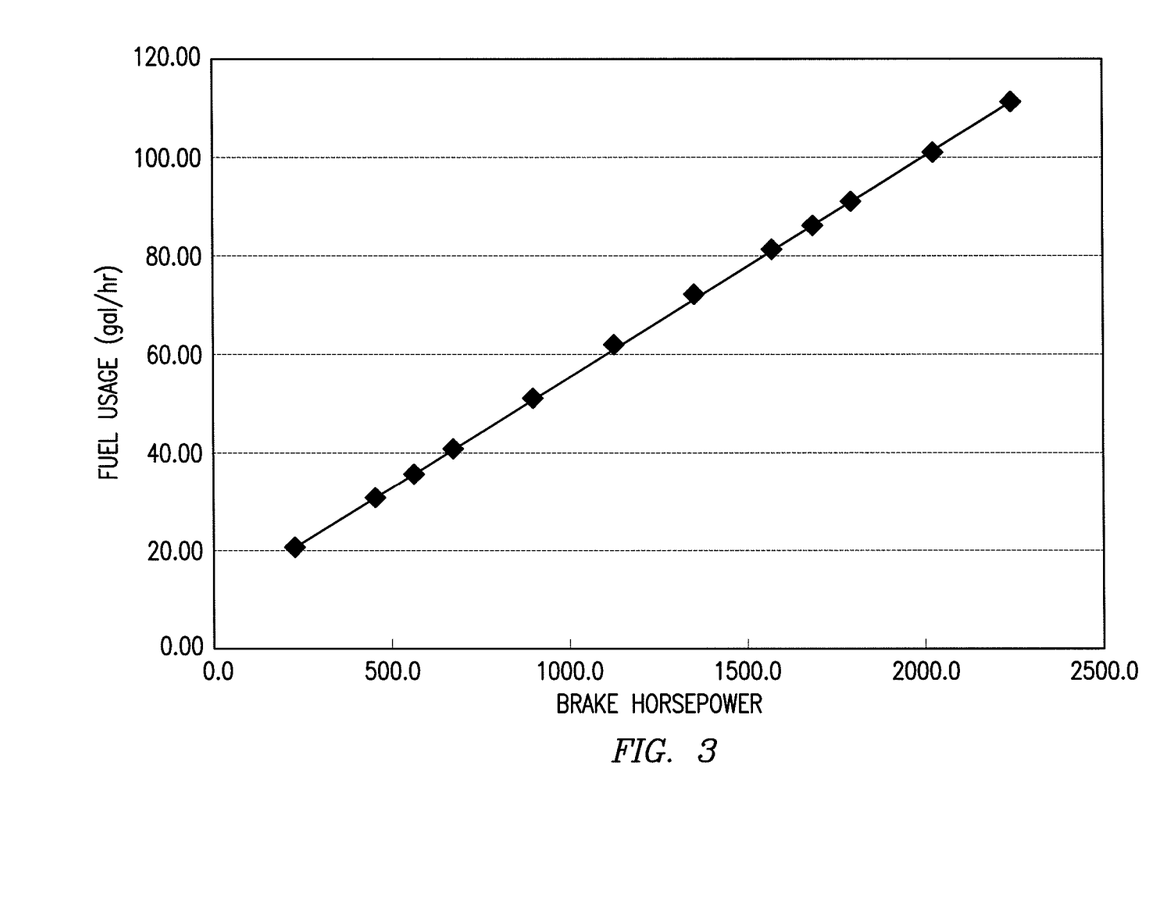
FIG. 3 is a graph illustrating data relating to fuel consumption rate of an engine as a function of brake horsepower at an engine speed of 1900 rpm according to one embodiment of the present disclosure.
Figure 4:
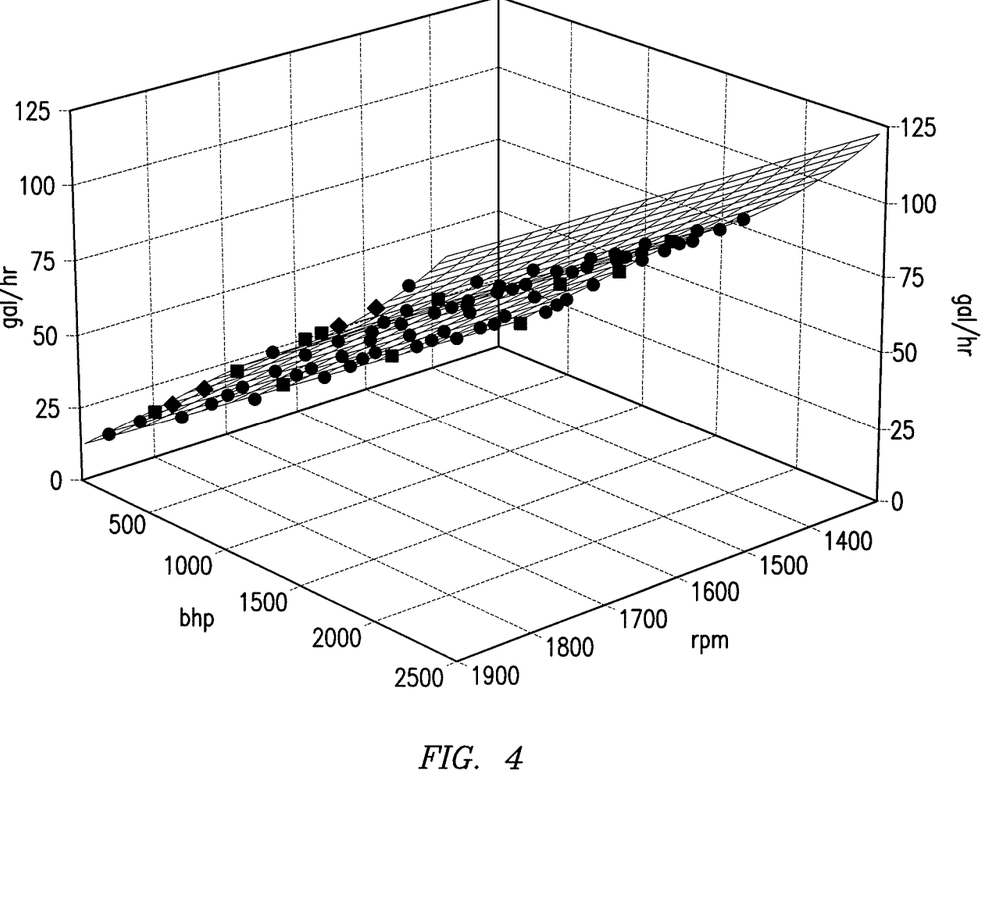
FIG. 4 is a 3-D graph illustrating data relating to fuel consumption rate of an engine as a function of engine speed and total brake horsepower ($BHP_{total}$) according to one embodiment of the present disclosure.

One embodiment of a method of the present disclosure for calculating and minimizing fuel consumption for a single engine will now be described. FIGS. 2, 3, and 4 each provide plots of data according to certain steps of this embodiment using, as an example, a 3512C CAT® engine manufactured by Caterpillar, Inc.

First, the total parasitic fuel consumption rate of the engine (i.e., the portion of the fuel consumption rate for the engine attributable to the total parasitic load in the unit) is determined as a function of engine speed. This may be determined by running the engine at certain selected speeds with the fluids at their normal running temperature with its transmission in a neutral position and measuring the amount of fuel consumed per hour. This data may be used to extrapolate the total parasitic fuel consumption rate for any engine speed. In certain embodiments, the total parasitic fuel consumption rates may be measured and/or extrapolated for a single engine of a particular type, model, or category, and that same data may be applied to other engines of that same type, model, or category. As a person of ordinary skill in the art with the benefit of this disclosure will recognize, if total parasitic fuel consumption rates are measured and/or extrapolated in this manner for an engine or a group of engines of a certain age or at certain operating conditions, it may be desirable to subsequently re-verify those rates following, for example, a significant change in the age of the equipment and/or operating conditions. In an example using the 3512C CAT® engine, the total parasitic fuel consumption rate (gal/hr) was measured at various engine speeds from 700 rpm to 1950 rpm, and that data is plotted in FIG. 2 as a function of engine speed (rpm) to provide the curve fit shown.

Next, the internal parasitic fuel consumption rate is determined at various intervals of speed (e.g., every 100 rpm) by plotting the total fuel consumption rate of the engine as a function of the brake horsepower of the engine for each speed interval and curve-fitting that data. In certain embodiments, the fuel consumption rates and brake horsepower data for a particular type and/or model of engine may be available from data sheets or other documentation provided by the engine manufacturer. Such data provided by an engine manufacturer may reflect, for example, the maximum fuel consumption rates and/or the minimum brake horsepower provided by the engine, and thus the actual fuel consumption rates and/or brake horsepower for a particular engine may vary somewhat from manufacturer-provided data. A person of skill in the art with the benefit of this disclosure will recognize circumstances under which such variances may occur (e.g., if the operating conditions or age or condition of a particular piece of equipment may impact its efficiency) and whether those variances are significant in the context of a particular application of the present disclosure. In other embodiments, this data may be measured directly or otherwise determined experimentally.

The y-intercept of this fuel usage versus brake horsepower at a fixed engine speed curve corresponds to the internal fuel parasitic consumption rate for the engine. The slope of this curve corresponds to the horsepower unit fuel consumption rate (gal/hr/bhp). In the example using the 3512C CAT® engine, the fuel consumption rates and brake horsepower data at seven different engine speeds (from 1300 rpm to 1900 rpm) were obtained from product data sheets and curve-fitted to calculate the slope and y-intercept for the curve fits at each speed. The plot used to provide the curve-fit data for the 1900 rpm engine speed is shown in FIG. 3, and the slope and y-intercept data for each of the seven curve fits is shown in Table 1 below.

TABLE 1

| Engine speed (rpm) | Horsepower unit fuel consumption rate (gal/hr/bhp) | Internal parasitic fuel consumption rate (gal/hr) |
|---|---|---|
| 1300 | 0.0451 | 5.2874 |
| 1400 | 0.0442 | 7.105 |
| 1500 | 0.0439 | 8.1434 |
| 1600 | 0.0434 | 8.6797 |
| 1700 | 0.0433 | 9.1124 |
| 1800 | 0.0439 | 9.6164 |
| 1900 | 0.0448 | 10.704 |

The internal parasitic fuel consumption rate may be divided by the horsepower unit fuel consumption rate to give the internal parasitic load ($BHP_{int}$) at each engine speed.

The external parasitic fuel consumption rates for the engine at each engine speed can be calculated by subtracting each of the internal parasitic fuel consumption rates from the total parasitic fuel consumption rate at the corresponding speed, which then may be divided by the horsepower unit fuel consumption rate to give the external parasitic load ($BHP_{ext}$) at each engine speed. For example, at 1900 rpm, the external parasitic fuel load may be calculated according to Equation (1) below.

$$BHP_{ext} = (21.23 - 10.7040)/0.0448 = 234.9554 \text{ bhp} \quad (1)$$

As a person of ordinary skill in the art with the benefit of this disclosure will recognize, the external parasitic load ($BHP_{ext}$) alternatively may be calculated by subtracting the internal parasitic load ($BHP_{int}$) from the total parasitic load, which may be calculated by dividing the total parasitic fuel consumption rate by the horsepower unit fuel consumption rate.

The total brake horsepower load ($BHP_{total}$) needed from the engine to perform a particular operation can be calculated by adding the external parasitic load ($BHP_{ext}$) to the desired hydraulic horsepower (HHP) to be provided by that engine for a particular job. The desired hydraulic horsepower (HHP) for a particular job may be calculated according to Equation (2) below, $$HHP = (\text{fluid pressure} \cdot \text{flow rate})/1714 \quad (2)$$

wherein fluid pressure is expressed in pounds per square inch (psi) and the fluid flow rate is expressed in gallons per minute. The total fuel consumption rate data (e.g., from the engine manufacturer's documentation) can then be plotted as a function of both total brake horsepower loads ($BHP_{total}$) and engine speed. A 3-D curve fit can be generated to create a formula for calculating fuel usage for any combination of engine speed and desired hydraulic horsepower as a function of those two variables. An example of a 3-D plot generated using the data described above in the example using the 3512C® CAT engine is shown in FIG. 4. In this example, the data is fit to the general Equation (3) below:

$$z = a + bx + cx^2 + dx^3 + ey + fy^2 + gy^3 + hy^4 \quad (3)$$

where x is the engine speed in rpm, y is the total brake horsepower load, and z is the fuel consumption rate in gal/hr. In other embodiments of the present disclosure, higher or lower order equations may be used to curve-fit the engine speed and total brake horsepower data depending upon, among other things, the desired level of accuracy, the particular type of engine or other equipment being modeled, and/or other factors that a person of ordinary skill in the art with the benefit of this disclosure will recognize. In the example shown in FIG. 4, the exponents and constants in this formula were determined to have the following values:

a=287.93249
b=0.56450126
c=0.00035957449
d=7.6647357×10$^{-8}$
e=0.03164887
f=3.1195492×10$^{-5}$
g=2.3663513×10$^{-8}$
h=5.4665637×10$^{-12}$

Applying these exponents and constants to Equation (3), if the 3512C® CAT engine is operated at a speed of 1900 rpm to provide 1995 bhp of hydraulic horsepower, it will consume approximately 112 gallons/hour of fuel.

A formula of this type can be used to calculate total fuel consumption for any engine used at a job site, and/or to identify the engine speeds and transmission gears of a particular pumping unit or other equipment that will use the smallest amount of fuel for an operation (e.g., a fracturing operation) requiring a particular amount of hydraulic horsepower. Such calculations may be made manually or by a computerized and/or automated device having the appropriate programming, data processing, and/or storage capabilities. These calculations may be performed at some point in time prior to the start of the operation in which the equipment is to be used (e.g., while a particular operation is being planned and/or discussed with a customer), and/or they may be performed as the operation is being performed. These calculations may be performed at the job site itself and/or at a remote location where data relating to the equipment at the job site is stored and/or received. In certain embodiments, a computer processor of the present disclosure may be further programmed to perform the calculations described above and/or to automatically select the engine speeds and transmission gears that will use the least amount of fuel. In certain embodiments, the fuel consumption data for a plurality of engines or different pieces of equipment at a particular job site may be analyzed in a similar manner to generate equations that can be used to identify combinations of engine speeds and transmission gears for each piece of equipment that may reduce or minimize the total amount of fuel used by all of the equipment.

In certain embodiments, one or more computer processors of the present disclosure may be programmed to generate a formula for total fuel consumption and/or to perform some or all of the calculations described above. Such a computer processor may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. The computer processor also may be equipped with any software, programming, and/or executable instructions that, when executed, cause the processor to perform one or more of the actions, calculations, or steps of the methods of the present disclosure described herein. For example, the computer processor may be equipped with any software, programming, and/or executable instructions known in the art for performing curve fits on numeric data. In certain embodiments, the computer processor also may be provided with data relating to the fuel consumption rates, engine loads, job parameters, and/or other data relating to the calculations described above and perform some or all of those calculations described above. In certain embodiments, the computer processor may be coupled to a memory device where data, software, programming, and/or executable instructions are stored. Such memory devices may comprise a hard drive, random access memory (RAM), read-only memory (ROM), or other similar storage media known in the art, and may include a set of instructions that when executed by the processor cause the processor to perform one or more of the actions, calculations, or steps of the methods of the present disclosure described herein.

In certain embodiments, the computer processor may be located at the job site, such as control equipment 116 shown in FIG. 1. In other embodiments, the computer processor, controller, or system may be located at an offsite location (e.g., a remote real-time operating center). In certain embodiments, such computer processors, whether onsite or offsite, may be programmed to control and/or adjust the operation of certain engines or other motorized equipment at the job site based at least in part on the data relating to fuel consumption rates, engine loads, job parameters, and/or the calculations described above. In certain embodiments, these components may be programmed to control and/or adjust the operating speeds and/or transmission gears of certain engines or other motorized equipment at the job site so as to meet a target level of fuel consumption. This target may include, for example, a total amount of fuel for one or more pieces of equipment, a maximum or average amount of fuel for one or more pieces of equipment per unit of time (e.g., per day), or any combination thereof.

The systems and methods of the present disclosure may be used to monitor, calculate, optimize, and/or control fuel consumption in conjunction with any subterranean operation. For example, as discussed above, the systems and methods of the present disclosure may be used in fracturing operations, drilling operations, and/or cementing operations. However, the systems and methods of the present disclosure may be used in one or more other types of operations at a job site, including but not limited to stimulation operations (e.g., acidizing), completion operations, remedial operations, and the like. A person of skill in the art, with the benefit of this disclosure, will recognize how to apply or implement the systems and methods of the present disclosure as disclosed herein in a particular operation.

An embodiment of the present disclosure is a method that comprises: calculating a set of fuel consumption rates for one or more engines at a job site as a function of a speed of each engine, a hydraulic horsepower load to be provided by each engine, and an external parasitic load to be provided by each engine; identifying one or more operating speeds for the one or more engines during an operation at the job site based at least in part on the set of fuel consumption rates for the one or more engines; and operating the one or more engines at the one or more operating speeds during an operation at the job site.

Another embodiment of the present disclosure is a control system comprising: at least one data processor; and a memory comprising executable instructions that, when executed, cause the at least one data processor to calculate a set of fuel consumption rates for one or more engines at a job site as a function of a speed of each engine, a hydraulic horsepower load to be provided by each engine, and an external parasitic load to be provided by each engine; identify one or more operating speeds for the one or more engines during an operation at the job site based at least in part on the set of fuel consumption rates for the one or more engines; and operate the one or more engines at the one or more operating speeds during an operation at the job site.

Another embodiment of the present disclosure is a method comprising: providing a set of total parasitic fuel consumption rates for an engine at a job site at one or more engine speeds; providing a set of internal parasitic fuel consumption rates for the engine at one or more engine speeds and a horsepower unit fuel consumption rate for the engine at one or more engine speeds; determining a set of external parasitic fuel consumption rates for the engine at one or more engine speeds based on at least the differences between the total parasitic fuel consumption rates and the internal parasitic fuel consumption rates at the one or more engine speeds; determining a set of external parasitic loads of the engine at one or more engine speeds based on at least the set of external parasitic fuel consumption rates and the horsepower unit fuel consumption rate; determining a set of total brake horsepower loads of the engine at one or more engine speeds by adding the external parasitic load to the hydraulic horsepower at the one or more engine speeds; and plotting and curve-fitting the total fuel consumption rates as a function of total brake horsepower loads and engine speed to generate a formula for total fuel consumption of the engine.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. The terms in the claims have their plain, ordinary meaning unless otherwise explicitly and clearly defined by the patentee.

What is claimed is:

1. A method comprising:
    calculating a set of fuel consumption rates for one or more engines at a job site as a function of a speed of each engine, a hydraulic horsepower load to be provided by each engine, and an external parasitic load to be provided by each engine;
    identifying one or more operating speeds for the one or more engines during an operation at the job site based at least in part on the set of fuel consumption rates for the one or more engines;
    wherein at least a portion of the steps of calculating the set of fuel consumption rates for the one or more engines at the job site and identifying the one or more operating speeds for the one or more engines during the operation at the job site is performed substantially in or near real time with the operation at the job site; and
    operating the one or more engines at the one or more operating speeds during an operation at the job site.

2. The method of claim 1 wherein the job site comprises a well site wherein a well bore has been drilled to penetrate at least a portion of a subterranean formation.

3. The method of claim 2 wherein the operation comprises at least a portion of a subterranean fracturing operation.

4. The method of claim 1 wherein identifying one or more operating speeds for the one or more engines comprises identifying the speed at which the fuel consumption rate for the one or more engines is the lowest for a preselected hydraulic horsepower load for the one or more engines.

5. The method of claim 1 wherein identifying one or more operating speeds for the one or more engines comprises identifying the operating speed for at least one of the engines at which the fuel consumption rate for the engine is the lowest for a preselected hydraulic horsepower load for the engine.

6. The method of claim 1 wherein the one or more engines comprise a plurality of engines at a job site.

7. The method of claim 6 wherein identifying one or more operating speeds for the plurality of engines comprises identifying the combination of speeds at which the sum of the fuel consumption rates for the plurality of engines is the lowest for a preselected set of hydraulic horsepower loads for the plurality of engines.

8. The method of claim 1 further comprising, adjusting the operating speeds of the one or more engines during the operation at the job site based at least in part the operating speeds for the one more engines identified substantially in or near real time with the operation.

9. The method of claim 8 wherein a computer processor automatically performs the step of adjusting the operating speeds of the one or more engines during the operation at the job site based at least in part the operating speeds for the one more engines identified substantially in or near real time with the operation.

10. The method of claim 1 wherein at least a portion of the steps of calculating a set of fuel consumption rates for one or more engines at a job site and identifying one or more operating speeds for the one or more engines during an operation at the job site is performed at a location remote from the job site.

11. A control system comprising:
at least one data processor; and
a memory comprising executable instructions that, when executed, cause the at least one data processor to calculate a set of fuel consumption rates for one or more engines at a job site as a function of a speed of each engine, a hydraulic horsepower load to be provided by each engine, and an external parasitic load to be provided by each engine;
identify one or more operating speeds for the one or more engines during an operation at the job site based at least in part on the set of fuel consumption rates for the one or more engines;
wherein the executable instructions, when executed, cause the at least one data processor to calculate the set of fuel consumption rates for the one or more engines at the job site and identify one or more operating speeds for the one or more engines during the operation at the job site substantially in or near real time with an operation at the job site; and
operate the one or more engines at the one or more operating speeds during an operation at the job site.

12. The control system of claim 11 further comprising an external communications interface communicatively coupled to the data processor, wherein the external communications interface is communicatively coupled to a network and permits data from the control system to be remotely accessed by a computer system communicatively coupled to the network.

13. The control system of claim 11 wherein the executable instructions, when executed, further cause the at least one data processor to adjust the operating speeds of the one or more engines during the operation at the job site based at least in part the operating speeds for the one more engines identified substantially in or near real time with the operation.

14. The control system of claim 11 wherein the executable instructions, when executed, cause the at least one data processor to identify one or more operating speeds for the one or more engines by identifying the speed at which the fuel consumption rate is the lowest for a preselected hydraulic horsepower load for the one or more engines.

15. A method comprising:
providing a set of total parasitic fuel consumption rates for an engine at a job site at one or more engine speeds;
providing a set of internal parasitic fuel consumption rates for the engine at one or more engine speeds and a horsepower unit fuel consumption rate for the engine at one or more engine speeds;
determining a set of external parasitic fuel consumption rates for the engine at one or more engine speeds based on at least the differences between the total parasitic fuel consumption rates and the internal parasitic fuel consumption rates at the one or more engine speeds;
determining a set of external parasitic loads of the engine at one or more engine speeds based on at least the set of external parasitic fuel consumption rates and the horsepower unit fuel consumption rate;
determining a set of total brake horsepower loads of the engine at one or more engine speeds by adding the external parasitic load to the hydraulic horsepower at the one or more engine speeds;
plotting and curve-fitting the total fuel consumption rates as a function of total brake horsepower loads and engine speed to generate a formula for total fuel consumption of the engine;
using the formula for total fuel consumption of the engine to identify the one or more operating speeds for the engine during the operation at the job site; and
operating the one or more engines at the one or more operating speeds during an operation at the job site.

16. The method of claim 15 wherein the set of internal parasitic fuel consumption rates and the horsepower unit fuel consumption rate are calculated based at least in part on data relating to the brake horsepower values of the engine and the total fuel consumption rates of the engine.

17. The method of claim 15 wherein the job site comprises a well site wherein a well bore has been drilled to penetrate at least a portion of a subterranean formation.

* * * * *